United States Patent [19]
Ragsdale et al.

[11] Patent Number: 5,655,738
[45] Date of Patent: Aug. 12, 1997

[54] CABLE MANAGEMENT DEVICE

[76] Inventors: Thomas Ray Ragsdale, 3533 Boxwood Dr., Grapevine, Tex. 76051; Ronald Jeffrey Walden, 4602 Elderberry, Garland, Tex. 75043

[21] Appl. No.: 480,766

[22] Filed: Jun. 7, 1995

[51] Int. Cl.[6] ................................................. F16L 3/22
[52] U.S. Cl. ...................... 248/68.1; 248/74.1; 211/70.4
[58] Field of Search ............................ 248/65, 49, 74.1, 248/68.1; 211/70.4

[56] References Cited

U.S. PATENT DOCUMENTS

| | | | |
|---|---|---|---|
| 1,834,404 | 12/1931 | Koch | 248/68.1 |
| 2,972,461 | 2/1961 | Balbach et al. | 248/74.1 X |
| 4,344,480 | 8/1982 | Boyer et al. | 248/68.1 X |
| 4,395,009 | 7/1983 | Bormke | 248/68.1 |
| 4,840,333 | 6/1989 | Nakayama | 248/68.1 |
| 4,865,280 | 9/1989 | Wollar | 248/68.1 |
| 5,060,810 | 10/1991 | Jones | 248/68.1 X |

FOREIGN PATENT DOCUMENTS 768339  2/1957  United Kingdom ................ 248/68.1

*Primary Examiner*—Ramon O. Ramirez
*Assistant Examiner*—Brian J. Hamilla
*Attorney, Agent, or Firm*—Lisa L. B. Yociss

[57] ABSTRACT

A cable management device is disclosed for holding a plurality of cables including a cable holding main body having a plurality of juxtaposed compartments, and an arm for enclosing the compartments. The main body is preferably pleated having a series of adjoining V-shaped compartments for receiving the cables. Each compartment includes at least one side wall and an open side. The arm includes a pivot end, a terminating end, and at least one tab located near the terminating end. The pivot end is pivotably secured to a first compartment. A second, or preferably last, compartment includes an opening through one side wall of the last compartment for releasably receiving the tab, so that the arm may be easily secured and released. The cable management device preferably includes a first plurality of compartments open on a top of the main body, and a second plurality of compartments open on a bottom of the main body. The device may also include a second arm, similar to the first arm, where the first arm encloses the first plurality of compartments, and the second arm encloses the second plurality of compartments.

11 Claims, 3 Drawing Sheets

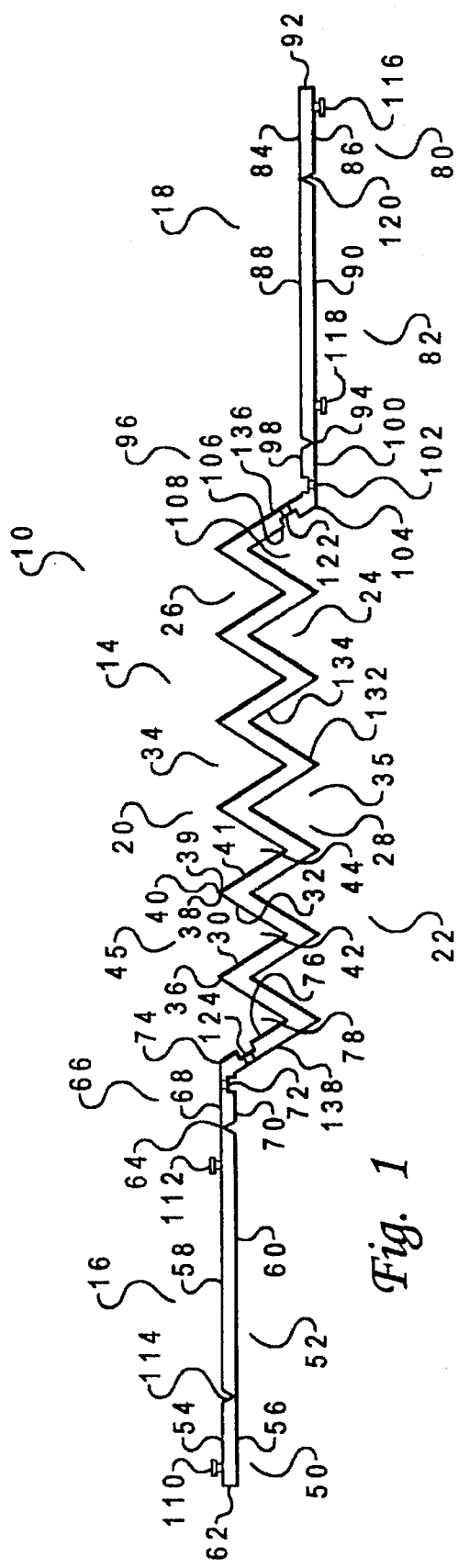
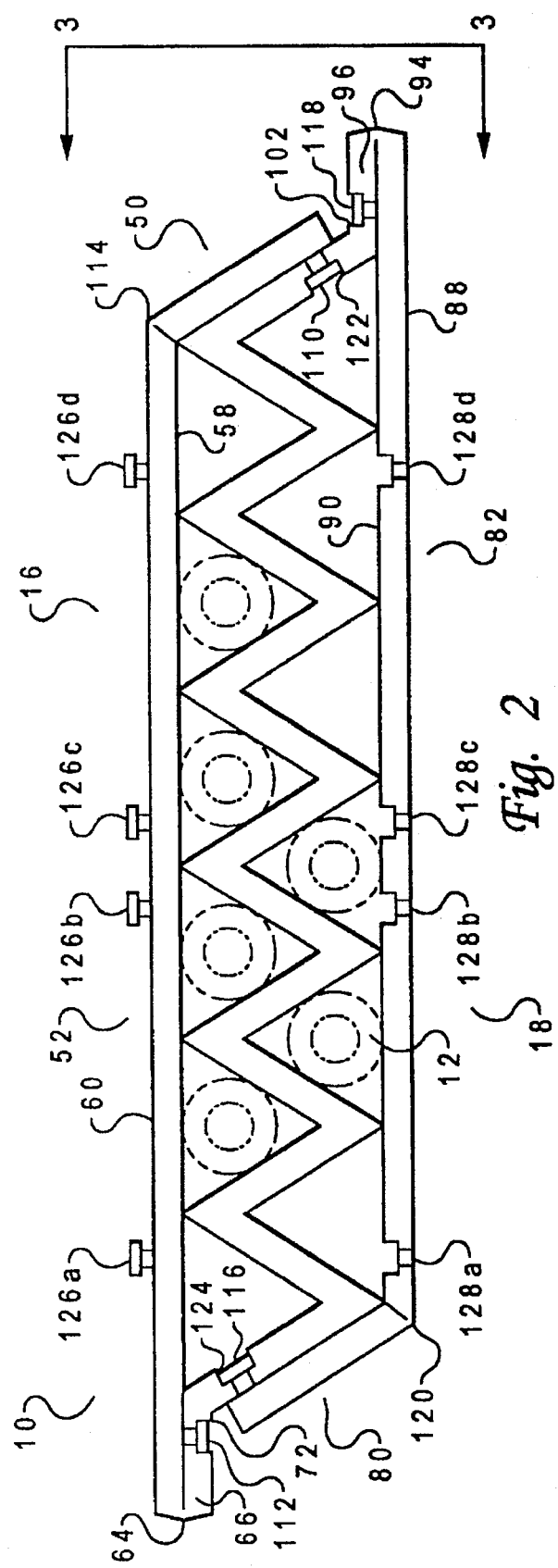
Fig. 1
Fig. 2

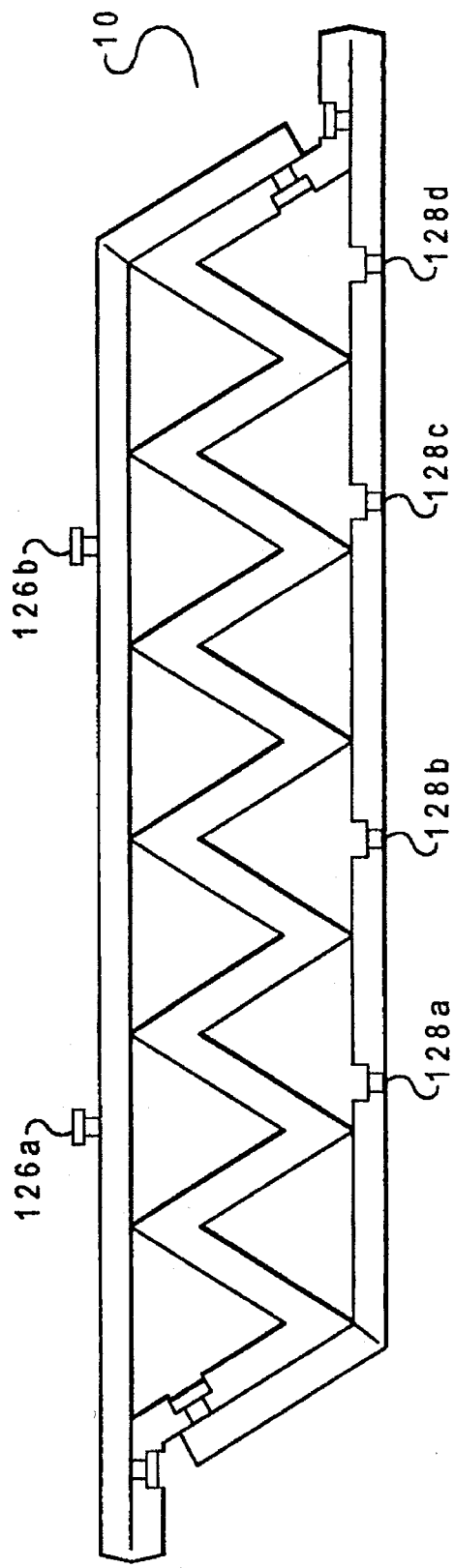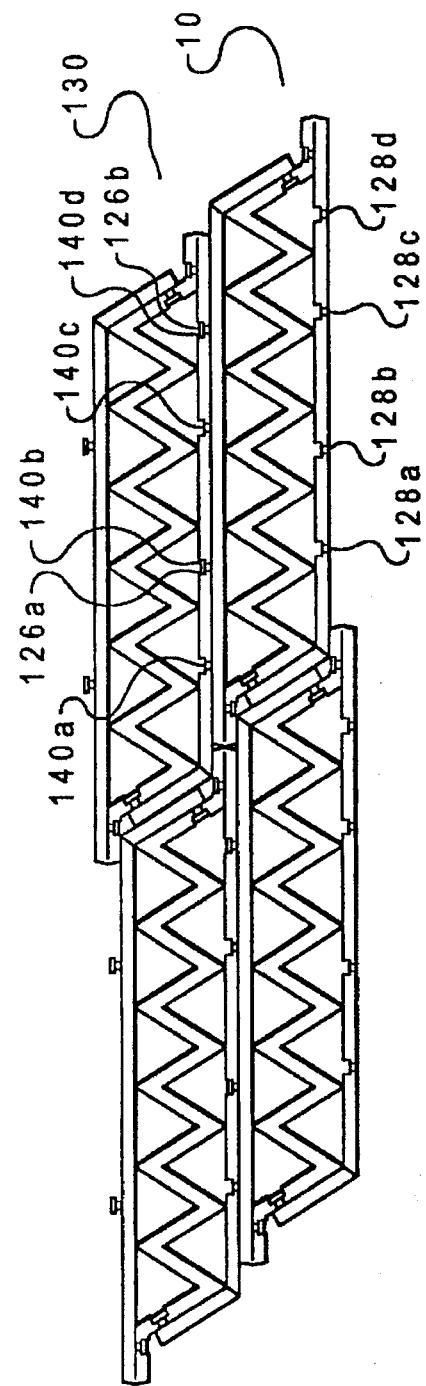

CABLE MANAGEMENT DEVICE

BACKGROUND OF THE INVENTION

1. Technical Field

The present invention relates to a cable management device, and in particular to a cable management device having a plurality of juxtaposed compartments for receiving cables. Still more particularly, the present invention relates to a cable management device having a plurality of juxtaposed compartments for receiving cables and an arm for releasably securing the cables within the compartments.

2. Description of the Related Art

It is often necessary to route multiple cables, such as through an office building, in order to provide required utilities and communications services such as electrical, telephone, and computer communication services. Often a large number of cables are required and are routed to various physical locations through the building to provide services to users. The cables are typically bundled together in order to be more manageable.

It is known in the art to secure the cables in a bundle utilizing a long, flexible plastic member which has an opening through the member at a first end. To secure the bundle, the member is placed around the cables. A second end of the member is inserted into and pulled through the opening at the first end. A plurality of ridges included on the member permanently hold the second end within the opening. Multiple members are utilized and spaced along the cables to secure the cables in bundles throughout a facility. When a user desires to reroute cables, the member must be cut. Once cut, the member may not be reused.

Cables frequently need to be rerouted or removed. Users often require additional or different services because of movement of a telephone or computer within an office. In addition, users may be physically relocated, or users added or removed, thus requiring a reconfiguration of the cables. When this occurs, cables may need to be added to a bundle or removed, thus requiring the removal of all members utilized to secure the cables in the bundle. Once the cables have been added or removed, new members must be secured around the cables to hold the cables in a bundle. This process is very time consuming.

SUMMARY OF THE INVENTION

A cable management device is disclosed for holding a plurality of cables including a cable holding main body having a plurality of juxtaposed compartments, and an arm for enclosing the compartments. The main body is preferably pleated having a series of adjoining V-shaped compartments for receiving the cables. Each compartment includes at least one side wall and an open side. The arm includes a pivot end, a terminating end, and at least one tab located near the terminating end. The pivot end is pivotably secured to a first compartment. A second, or preferably last, compartment includes an opening through one side wall of the last compartment for releasably receiving the tab, so that the arm may be easily secured and released. The cable management device preferably includes a first plurality of compartments open on a top of the main body, and a second plurality of compartments open on a bottom of the main body. The device may also include a second arm, similar to the first arm, where the first arm encloses the first plurality of compartments, and the second arm encloses the second plurality of compartments.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 1 is a side view of a cable management device in accordance with the present invention;

FIG. 2 is a side view of a second embodiment of a cable management device including a plurality of tabs and openings for coupling multiple cable management devices together in accordance with the present invention;

FIG. 5 is a side view of a third embodiment of a cable management device including a plurality of tabs and openings for coupling multiple cable management devices together in accordance with the present invention; and FIG. 6 is a side view of multiple cable management devices implemented utilizing the third embodiment coupled together in accordance with the present invention.

DETAILED DESCRIPTION OF PREFERRED EMBODIMENT

Figure 4:
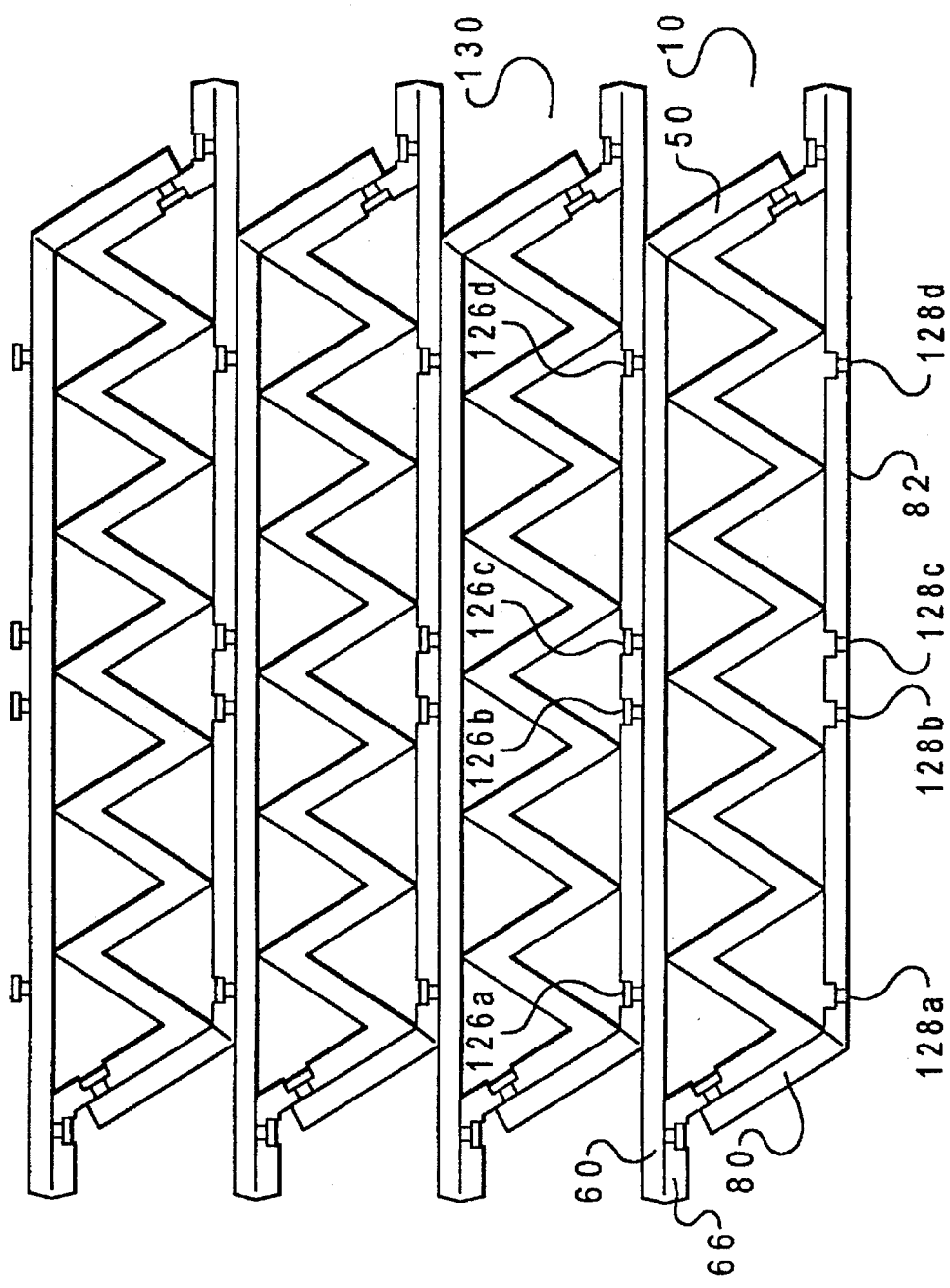
FIG. 4 is a side view of multiple cable management devices implemented utilizing the second embodiment coupled together in accordance with the present invention.
Figure 3:
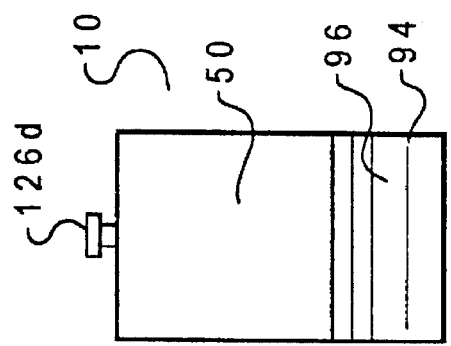
FIG. 3 is an end view of a cable management device depicting a tab in accordance with the present invention taken along line 3—3 shown in FIG. 2.

With reference now to the figures, FIG. 1 depicts a side view of a cable management device in accordance with the present invention. FIG. 2 is a side view of a second embodiment of a cable management device including a plurality of tabs and openings for coupling multiple cable management devices together in accordance with the present invention. FIG. 3 is an end view of a cable management device depicting a tab in accordance with the present invention taken along line 3—3 shown in FIG. 2. FIG. 4 is a side view of multiple cable management devices implemented utilizing a second embodiment coupled together in accordance with the present invention. FIG. 5 is a side view of a third embodiment of a cable management device including a plurality of tabs and openings for coupling multiple cable management devices together in accordance with the present invention. FIG. 6 is a side view of multiple cable management devices implemented utilizing a third embodiment coupled together in accordance with the present invention.

FIG. 1 depicts a cable management device 10 for releasably holding a plurality of cables 12, such as telephone or electrical cables. Of course those skilled in the art will recognize that cable management device 10 may be sized so that any type, size, or quantity of cables may be held by cable management device 10.

Cable management device 10 may be formed from plastic or rubber and includes a main body 14, a first arm 16, and a second arm 18. First arm 16 and second arm 18 are utilized to hold cables 12 within main body 14. Main body 14 is comprised of a top 20, a bottom 22, and a plurality of juxtaposed compartments 24 which include a first plurality 26 of compartments and a second plurality 28 of compartments. Each of the plurality of compartments 24 include side walls, for example side walls 30 and 32. First plurality 26 of compartments have an open side 34 open on top 20 of main body 14. Second plurality 28 of compartments have an open side 35 open on bottom 22 of main body 14.

Each of the side walls have a terminating end, for example side walls 30 and 32 have a terminating end 36 and 38, respectively. An end area 40 is integrally formed between terminating ends 38 and 39 of two side walls 32 and 41 of adjoining compartments 42 and 44. The open side 45 for compartment 42 is defined by the terminating ends 36 and 38 of the two side walls 30 and 32 of compartment 42.

As shown in the drawings, the end area may be a peak when the main body is pleated and the compartments are triangular. However, those skilled in the art will recognize that the end area may be a crest when the compartments are U-shaped, or the end area may be a platform when the compartments are generally rectangular-shaped.

Open sides 34 of first plurality 26 of compartments may be enclosed by first arm 16. Open sides 35 of second plurality 28 of compartments may be enclosed by second arm 18. In this manner, cables 12 may be placed within plurality of compartments 24 and secured by first 16 and second 18 arms.

First arm 16 includes a first portion 50, a second portion 52, a top 54 of first portion 50, a bottom 56 of first portion 50, a top 58 of second portion 52, a bottom 60 of second portion 52, a terminating end 62, and a pivot end 64 which is formed integrally with a first platform 66. Pivot end 64 is preferably formed from a material which permits pivoting without breaking, such as a resilient plastic. First platform 66 includes a top 68, a bottom 70, and an opening 72. First platform 66 is formed integrally with one terminating end 74 of side wall 76 of compartment 78.

Second arm 18 includes a first portion 80, a second portion 82, a top 84 of first portion 80, a bottom 86 of first portion 80, a top 88 of second portion 82, a bottom 90 of second portion 82, a terminating end 92, and a pivot end 94 which is formed integrally with a second platform 96. Pivot end 94 is preferably formed from a thin resilient plastic which permits pivoting without breaking. Second platform 96 includes a top 98, a bottom 100, and an opening 102. Second platform 96 is formed integrally with one terminating end 104 of side wall 106 of compartment 108.

First arm 16 also includes at least one tab 110 on top 54 of first portion 50, at least one tab 112 on top 58 of second portion 52, and a groove 114 near terminating end 62 of first arm 16 and between first portion 50 and second portion 52 for permitting first portion 50 to pivot about second portion 52 so that first portion 50 is folded toward second portion 52 through groove 114. Those skilled in the art will understand that tab 112 is included to provide additional support.

Second arm 18 also includes at least one tab 116 on bottom 86 of first portion 80, at least one tab 118 on bottom 90 of second portion 82, and a groove 120 near terminating end 92 of second arm 18 and between first portion 80 and second portion 82 for permitting first portion 80 to pivot about second portion 82 so that first portion 80 is folded toward second portion 82 through groove 120. Those skilled in the art will understand that tab 118 is included to provide additional support.

First and second arms 16, 18 pivot about their respective pivot ends 64, 94 so as to permit opening and enclosing of first 26 and second 28 plurality of compartments, respectively, of main body 14. Tab 110 is received within an opening 122 through side wall 106 when first arm 16 is to enclose first plurality 26 of compartments. Tab 112 is received within opening 72 to provide additional support when first arm 16 is secured to main body 14. Tab 116 is received within an opening 124 through side wall 76 when second arm 18 is to enclose second plurality 28 of compartments. Tab 118 is received within opening 102 to provide additional support when second arm 18 is secured to main body 14.

A first plurality of tabs 126a, 126b, 126c, and 126d are formed integrally on bottom 60 of second portion 52 of first arm 16. A first plurality of openings 128a, 128b, 128c, and 128d are formed through second portion 82 of second arm 18. Tabs 126a, 126b, 126c, and 126d of cable management device 10 may be received within openings 128a, 128b, 128c, and 128d of a cable management device 130 in order to temporarily engage cable management device 10 with cable management device 130. In this manner, multiple cable management devices may be coupled together in order to hold a larger number of cables.

Those skilled in the art will recognize that tabs 126a, 126b, 126c, and 126d may include any number of tabs. Four tabs are illustrated in FIGS. 2 and 4 to provide additional support, for example when large cables are used. Two tabs are illustrated in FIGS. 5 and 6 for increased flexibility. When two tabs 126a and 126b are utilized, openings 128a, 128b, 128c, and 128d are provided with spacing between the openings as depicted in FIGS. 5 and 6. Multiple cable management devices may be stacked both vertically and horizontally, as depicted in FIG. 6 by inserting tab 126a into opening 140b and inserting tab 126b into opening 140d. Openings 128a, 128b, 128c, and 128d correspond to 140a, 140b, 140c, and 140d.

In operation, cables 12 are inserted into plurality of compartments 24. Cables 12 are received by side walls 30 and 32, and by side walls 132 and 134. First arm 16 is pivoted about pivot end 64 toward main body 14 until second portion 52 encloses first plurality of compartments 26. Tab 112 is received within opening 72. Thereafter, first portion 50 is folded through groove 114 until first portion 50 rests against side wall 136. Side wall 136 is preferably a side wall of a compartment which would have been included within first plurality 26 of compartments. Once first portion 50 is folded and rests against side wall 136, tab 110 is received within opening 122. All tabs are deformed slightly while being inserted into the openings and then, once in place, regain their original shape. The openings are shaped so as to securely hold the tabs without allowing the tabs to protrude into the compartments. Once inserted into an opening, the tabs are recessed slightly from the side wall.

Second arm 18 is pivoted about pivot end 94 toward main body 14 until second portion 82 encloses second plurality of compartments 28. Thereafter, first portion 80 is folded through groove 120 until first portion 80 rests against side wall 138. Side wall 138 is preferably a side wall of a compartment which would have been included within second plurality 28 of compartments. Tab 118 is received within opening 102. Once first portion 80 is folded and rests against side wall 138, tab 116 is received within opening 124. Tab 116 is deformed slightly while being inserted into opening 124 and then, once in place, regains its original shape.

Multiple cable management devices may be coupled together by inserting tabs 126a and b of cable management device 10 into openings 140b and d of cable management device 130 as depicted in FIG. 6. This step may be repeating in order to couple additional cable management devices together in order to be able to hold a large number of cables.

When a user desires to remove or reroute cables, cables 12 may be removed from device 10 by removing tabs 110, 112, 116, and 118 from openings 122, 72, 124, and 102, respectively. Once the cables have been rerouted, cables may once again be inserted into plurality of compartments 24 and tabs 110, 112, 116, and 118 inserted into openings 122, 72, 124, and 102, respectively. In this manner, a user may insert cables and enclose them in device 10, and then easily reroute them at a later time by simply removing the tabs from the openings. Once the cables have been rerouted, the cables are once again enclosed within device 10.

The cable management device described above offers significant advantages over the prior art. The cable management device is a reusable device which permits a user to secure multiple cables together in a manageable stack or ordered set, while permitting easy identification of each cable. In order to identify a particular cable within a bundle, a tag or label is usually secured around the cable. In addition, cables might be color-coded for identification purposes. Unlike a bundle of cables, where it is difficult to quickly and easily locate a particular cable, cable management device permits a user to assign a particular compartment to the particular cable. Therefore, when the cable needs to be located, a user may simply locate the assigned compartment.

In addition, cable management device permits a user to easily remove and replace cables when rerouting of cables is necessary. One arm of the device may be released from the main body by removing the appropriate tabs from their openings. A user may then rearrange the cables. Once the cables are correctly in place, the arm may be re-secured to the main body. The need for cutting each member as described by the prior art is eliminated.

While the invention has been particularly shown and described with reference to a preferred embodiment, it will be understood by those skilled in the art that various changes in form and detail may be made therein without departing from the spirit and scope of the invention.

What is claimed is:

1. A cable management device for releasably holding a plurality of cables, comprising:

a cable holding main body having top, a bottom, and a first plurality of juxtaposed compartments open on said top of said main body including a first compartment, a second plurality of juxtaposed compartments open on said bottom of said main body including a second compartment, each of said plurality of compartments having one open side and two side walls, wherein each of said plurality of cables may be placed in each of said plurality of compartments;

a first platform having a top, a bottom, and an opening in said platform, said first platform integral to said first compartment;

a second platform having a top, a bottom, and an opening through said platform, said second platform integral to said second compartment;

a first arm including a pivot end, a terminating end, a first tab located near said terminating end, and a second tab located near said pivot end, said second tab releasably received within said opening through said first platform, said pivot end pivotably secured to said first platform for enclosing said first plurality of compartments;

a second arm including a pivot end, a terminating end, a first tab located near said terminating end, a second tab located near said pivot end, said second tab releasably received within said opening through said second platform, said pivot end pivotably secured to said second platform for enclosing said second plurality of compartments;

said first compartment including an opening through one of said two side walls for releasably receiving said first tab of said second arm; and said second compartment including an opening through one of said two side walls for releasably receiving said first tab of said first arm, wherein said plurality of cables may be managed by easily adding and removing cables utilizing said cable management device.

2. The cable management device according to claim 1, wherein said second compartment is a last of said plurality of compartments.

3. The cable management device according to claim 1, wherein said first arm includes a first portion, a second portion, and a groove near said terminating end and between said first portion and said second portion for permitting said first portion to pivot about said second portion so that said first portion is folded toward said second portion through said groove.

4. The cable management device according to claim 1 wherein said second arm includes a first portion, a second portion, and a groove near said terminating end and between said first portion and said second portion for permitting said first portion to pivot about said second portion so that said first portion is folded toward said second portion through said groove.

5. The cable management device according to claim 4 wherein said first tab of said first arm is included within said first portion and said second tab is included within said second portion.

6. The cable management device according to claim 5 wherein said first tab of said second arm is included within said first portion and said second tab is included within said second portion.

7. The cable management device according to claim 1 wherein said first arm includes a top and a bottom, and wherein said first and second tabs are included on said top of said arm, and said second arm including a plurality of openings through said second arm, further comprising a plurality of tabs on said bottom of said first arm.

8. The cable management device according to claim 7 wherein said plurality of tabs on said bottom of said first arm are releasably received within a plurality of openings through a second arm of a second cable management device.

9. The cable management device according to claim 1 wherein said main body is pleated and said plurality of compartments are V-shaped.

10. A method for managing a plurality of cables, comprising:

placing each of said plurality of cables within a cable management device having a main body having top, a bottom, a first plurality of juxtaposed compartments open on said top of said main body including a first compartment having two side walls and an opening through one of said two side walls of said first compartment, a second plurality of juxtaposed compartments open on said bottom of said main body including a second compartment having two side walls and an opening through one of said two side walls of said second compartment, each of said plurality of compartments having one open side and two side walls, wherein each of said plurality of cables are received within each of said plurality of compartments, said cable management device also including a first platform having a top, a bottom, and an opening said platform, said first platform integral to said first compartment, and a second platform having a top, a bottom, and an opening through said platform, said second platform integral to said second compartment;

pivoting a first arm including a pivot end, a terminating end, a first tab located near said terminating end, and a second tab located near said pivot end, said pivot end pivotably secured to said first platform, toward said second compartment, securing said first tab releasably within said opening through said second compartment, and securing said second tab within said opening through said first platform;

pivoting a second arm including a pivot end, a terminating end, a first tab located near said terminating end, a second tab located near said pivot end, said pivot end pivotably secured to said second platform, toward said first compartment, securing said first tab releasably within said opening through said first compartment, and securing said second tab within said opening through said second platform, wherein said plurality of cables may be managed by easily adding and removing cables utilizing said cable management device.

11. The cable management device according to claim 10 where said first arm includes a top and a bottom, and wherein said first and second tabs are included on said top of said arm, and said second arm including a plurality of openings through said second arm, said first arm including a plurality of tabs on said bottom of said first arm, further comprising the step of releasably receiving said plurality of tabs on said bottom of said first arm within a plurality of openings through a second arm of a second cable management device, whereby multiple cable management devices may be coupled together to provide additional flexibility in managing said plurality of cables.

* * * * *